United States Patent Office 3,585,170
Patented June 15, 1971

3,585,170
POLYMERS
Harold George Burrows and Stephen John Hepworth, Manchester, England, assignors to Imperial Chemical Industries Limited, London, England
No Drawing. Filed Feb. 5, 1968, Ser. No. 702,816
Claims priority, application Great Britain, Feb. 7, 1967, 5,843/67
Int. Cl. C08g 20/00
U.S. Cl. 260—78                 8 Claims

ABSTRACT OF THE DISCLOSURE

Polyamides having high affinity for Acid Dyestuffs which polyamides are prepared by carrying out the polymerisation of the polyamide-forming components in the presence of an organic diamine salt of a phosphonic acid and a N-alkyl arylsulphonamide.

---

This invention relates to polyamides having an improved affinity for Acid Dyestuffs and to a process for the manufacture of the said polyamides.

It has previously been proposed to manufacture polyamides by polymerising a monoaminomonocarboxylic acid or lactam thereof having at least two carbon atoms between the amino and carboxylic acid groups, or substantially equimolecular proportions of a diamine which contains at least two carbon atoms between the amino groups and a dicarboxylic acid which contains at least two carbon atoms between the carboxylic acid groups, in the presence of from 0.1 to 10.0 molar percent, based on the molecular weight of the recurring units of the polyamide chain, of a salt of an organic diamine with a phosphonic acid of the formula

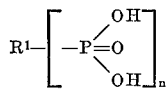

wherein $n$ is an integer of from 1 to 3, and $R^1$ is a mono-, di- or tri-valent organic radical depending on the value of $n$. Fibres prepared from the resulting polyamides, particularly those obtained by adding to the polymerisation mixture from 0.1 to 4 molar percent, based on the molecular weight of the recurring units of the polyamide chain, of a salt comprising one molecular proportion of an organic diamine and one molecular proportion of a phosphonic acid of the formula:

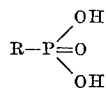

wherein R is a monovalent organic radical, have excellent affinity for Acid Dyestuffs.

It has now been found that this affinity for Acid Dyestuffs is further improved if the polymerisation is additionally carried out in the presence of certain N-alkyl-arylsulphonamides.

According to the present invention there are provided polyamides having an enhanced affinity for Acid Dyestuffs which are obtained by polymerising a monoaminomonocarboxylic acid or lactam thereof having at least two carbon atoms between the amino and carboxylic acid groups, or substantially equimolecular proportions of a diamine which contains at least two carbon atoms between the amino groups and a dicarboxylic acid which contains at least two carbon atoms between the carboxylic acid groups, in the presence of from 0.1 to 10.0 molar percent, based on the molecular weight of the recurring units of the polyamide chain, of a salt of an organic diamine with a phosphonic acid of the formula

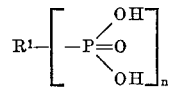

wherein $n$ is an integer of from 1 to 3, and $R^1$ is a mono-, di- or tri-valent organic radical depending on the value of $n$, and in the presence of from 0.1 to 5.0 molar percent, based on the molecular weight of the recurring units of the polyamide chain, of a sulphonamide of the formula:

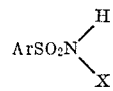

wherein Ar is a phenyl, tolyl or naphthyl radical, and X is an alkyl radical having from 1 to 12 carbon atoms.

As examples of the said alkyl radicals represented by X there may be mentioned methyl, ethyl, n-propyl, tert.-butyl, n-hexyl, n-octyl, n-decyl and n-dodecyl radicals.

The said organic radicals represented by $R^1$, which are attached to the phosphorus atom through a carbon atom of said radical, are preferably mono-, di- or tri-valent aliphatic, cycloaliphatic, aryl, aralkyl or aralkenyl radicals, or such radicals in which a carbon atom is replaced by a hetero atom, in particular the nitrogen atom. The said aliphatic radicals are preferably mono-, di- or tri-valent alkane or alkene radicals containing up to 12 carbon atoms such as vinyl, methyl, ethyl, propyl, butyl, hexyl, octyl, decyl, dodecyl, ethylene, trimethylene, propylene, tetramethylene, hexamethylene and 1:3:5-pentyl radicals. The said cycloaliphatic radicals are preferably monovalent cyclohexyl and C-methylcyclohexyl radicals. The said aralkyl or aralkenyl radicals are preferably monovalent monocyclic aryl/lower alkyl or alkenyl radicals such as benzyl, β-phenylethyl and β-phenylvinyl radicals. The said aryl radicals are preferably mono-, di- or tri-valent benzene or naphthalene radicals such as phenyl, tolyl, 1- or 2-naphthyl, 1:4-naphthylene, 1:3- or 1:4-phenylene and 1:5:8-naphthylene radicals. Such aryl radicals can in addition contain other substituents such as chlorine atoms. As examples of the said radicals in which one of the carbon atoms is replaced by a nitrogen atom there may be mentioned radicals of 5- or 6-membered nitrogen containing heterocyclic rings such as the piperidino radical, and alkane radicals having one of the carbon atoms replaced by a nitrogen atom such as alkyl-NH-alkylene-radicals, for example the β-(ethylamino) ethyl radical.

It is however preferred that $n$ represents 1 so that $R^1$ is a monovalent organic radical, preferably an alkyl, cycloalkyl, aralkyl or aryl radical, and above all a lower alkyl radical containing from 1 to 4 carbon atoms (such as methyl, ethyl, propyl and butyl radicals), a cyclohexyl radical, a monocyclic aryl radical (such as phenyl and tolyl radicals) or a monocyclic aryl alkyl radical (such as the benzyl radical).

The process of the invention can be carried out under the conditions normally employed for polymerising a polymerisable monoaminomonocarboxylic acid, or a lactam thereof, or for polymerising a mixture of a diamine and a dicarboxylic acid, or for polymerising a mixture of a polymerisable monoaminomonocarboxylic acid, a diamine and a dicarboxylic acid, the organic diamine salt of the phosphonic acid and the sulphonamide being added at any stage of the polymerisation process. It is however preferred to add the organic diamine salt of the phosphonic acid and the sulphonamide during the initial stages of the polymerisation and, above, at the stage of charging the reactants to the polymerisation vessel.

When starting from an equimolecular proportion of a diamine and a dicarboxylic acid the said compounds can be used in the form of a salt of each other; thus, for example, hexamethylene diammonium adipate can be used instead of a mixture of equimolecular proportions of adipic acid and hexamethylene diamine. However the said salt dissociates into the separate components prior to polymerisation taking place.

The process of the invention is preferably carried out at a temperature between 200° and 400° C., until the required degree of polymerisation is obtained.

The process of the invention can be carried out by either a batch or discontinuous process, or by a continuous process such as is described in British specifications Nos. 886,635, 924,630 and 964,822.

As specific examples of phosphonic acids which can be used in the form of salts with the organic diamines there may be mentioned methylphosphonic acid, ethylphosphonic acid, n-propylphosphonic acid, n-butylphosphonic acid, cyclohexylphosphonic acid, phenylphosphonic acid, β-phenylethylphosphonic acid, p-tolylphosphonic acid, p-chlorophenylphosphonic acid, 1:4-butane diphosphonic acid, 1:5-pentane diphosphonic acid, 1:4-cyclohexane diphosphonic acid, p-benzene diphosphonic acid, p-xylylene diphosphonic acid, 1:3:5-pentane triphosphonic acid and naphthalene 3:6:8-triphosphonic acid.

The organic diamines which are used in the form of salts with the phosphonic acids may be any organic compounds which contain two primary, secondary or tertiary amino groups or a combination of such groups, such as piperazine, 1:4-diazabicyclo(2:2:2)-octane, 4-dimethylaminopyridine, and 4-diethylaminopyridine, but more particularly aliphatic diamines in particular aliphatic diamines containng at least two, and preferably not more than 18 carbon atoms between the amino groups, such as trimethylenediamine, tetramethylenediamine, pentamethylenediamine and above all hexamethylenediamine. When the polyamide is being obtained by polymerisation of substantially equimolecular proportions of a diamine and a dicarboxylic acid, then it is preferred that the organic diamine which is in the form of the said salt with the phosphonic acid is the same as the diamine which is being polymerised with the dicarboxylic acid. Thus, for example, when a mixture of substantially equivalent amounts of hexamethylenediamine and adipic acid is being polymerised then it is preferred to use a salt of the phosphonic acid and hexamethylenediamine.

The salt of the phosphonic acid with the organic diamine can be the salt of either a half or one molecular proportion of organic diamine for each

group present in the phosphonic acid. Thus when $n$ has a value of 1 it can either be a salt of two molecular proportions of the phosphonic acid with one molecular proportion of the diamine, or a salt of one molecular proportion of the phosphonic acid with one molecular proportion of the diamine. The organic diamine salt of the phosphonic acid can be added as such to the polymerisation mixture, or alternatively there can be added the requisite amounts of the phosphonic acid and of the organic diamine in which case the salt is formed in situ. As a further alternative when polymerising substantially equimolecular proportions of a diamine and a dicarboxylic acid only the phosphonic acid need be added, in which event the phosphonic acid forms a salt with part of the diamine which is to be polymerised, thus resulting in the formation of a polymer having a greater percentage of carboxy end groups compared with the amine end groups.

The amount of the organic diamine salt of the phosphonic acid which is to be added to the polymerisation mixture is preferably between 0.2 and 4.0 molar percent based on the molecular weight of the recurring units of the polyamide chain.

The preferred amount of sulphonamide which is added to the polymerisation mixture is between 0.2 and 3.0 molar percent.

As specific examples of the said sulphonamides there may be mentioned N-methylbenzenesulphonamide, N-ethyl-p-toluenesulphonamide, N-n-butyl-p-toluenesulphonamide, N-dodecyl-p-toluenesulphonamide and N-ethylnaphthalene-2-sulphonamide.

As examples of the said polymerisable monoamino-monocarboxylic acids, or lactams thereof, there may be mentioned ε-aminocaproic acid, caprolactam, 9-aminononanoic acid, 11-aminoundecanoic acid, 17-aminoheptadecanoic acid, dodecanolactam, capryllactam, enantholactam and pyrrolidone.

As examples of the said diamines there may be mentioned diamines of the general formula $H_2N(CH_2)_mNH_2$ wherein $m$ is an integer of from 2 to 12, such as trimethylenediamine, tetramethylenediamine, pentamethylenediamine, octamethylenediamine and, above all, hexamethylenediamine.

As examples of the said dicarboxylic acids there may be mentioned terephthalic acid and isophthalic acid, and preferably the dicarboxylic acids of the formula

wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

If desired other ingredients which are commonly added during the formation of polyamides, for example delustrants such as titanium dioxide, fillers such as powdered glass, asbestos or mica, light stabilisers such as manganese salts, heat stabilisers such as copper salts and iodides, and molecular weight regulators such as acetic acid, can be added at the beginning of, during, or at the end of the polymerisation process of the present invention.

The polyamides of the invention can be converted into fibres by any of the conventional methods of producing fibres from polymers, for example by melt spinning, and the resulting fibres can then be used in conventional manner.

Fibres prepared from the polyamides of the invention have excellent affinity for Acid Dyestuffs when dyed from an aqueous dyebath, and this affinity is higher than that of fibres of polyamides which were prepared by polymerisation of polyamide-forming components in the presence of an organic diamine salt of a phosphonic acid but without any sulphonamide being present.

The invention is illustrated but not limited by the following examples in which the parts and percentages are by weight.

EXAMPLE 1

5240 parts of hexamethylene diammonium adipate, 8.1 parts of cyclohexylphosphonic acid, 23.2 parts of hexamethylenediamine, 52.0 parts of N-ethyl-p-toluene-sulphonamide and 2500 parts of water are heated in a stainless steel autoclave, with stirring, to 100° C. The autoclave is purged with steam, closed, and heating continued until a pressure of 250 lbs. per sq. inch (p.s.i.) and a temperature of 210° C. are obtained. The pressure in the autoclave is maintained at 250 p.s.i. by slow release of steam, while the temperature is raised to 235° C. The pressure in the autoclave is then slowly reduced during 1 hour to atmospheric pressure while the temperature is raised to 273° C. and this temperature is maintained for 10 minutes. The resulting polyamide is then extruded from the autoclave, under nitrogen pressure, in the form of a ribbon, which is quenched, chipped and dried.

The polyamide chips are then converted to fibres by a melt-spinning process. When these fibres are dyed with Solway Blue BN from aqueous dyebaths of pH 4.0, 7.0 and 9.0 the equilibrium dye up-take of the fibres is 5.5%, 2.0% and 0.5% respectively, compared with 4.25%, 0.8% and 0.26% for fibres obtained from a polyamide which was prepared as described above except that the 52.0 parts of N-ethyl-p-toluenesulphonamide were omitted from the autoclave.

EXAMPLE 2

Example 1 is repeated except that the usage of N-ethyl-p-toluenesulphonamide is reduced to 46.0 parts.

Fibres prepared from the resulting polyamide have equilibrium dye up-takes of 4.7%, 1.5% and 0.35% for Solway Blue BN when applied from aqueous dyebaths of pH 4.0, 7.0 and 9.0 respectively.

EXAMPLE 3

100 parts of hexamethylene diammonium adipate, 0.86 part of cyclohexylphosphonic acid, 0.73 part of hexamethylenediamine, 0.25 part of N-tert.-butyl naphthalene-2-sulphonamide and 20 parts of water are charged to an aluminium lined autoclave which is then subjected to the same heating and pressure cycles as are used in Example 1. The polyamide is then converted to fibres. The resulting polyamide fibres have a much higher uptake for Acid Dyestuffs when dyed from an aqueous dyebath of pH 8.5 than fibres which were similarly prepared in the absence of the 0.25 part of N-tert.-butyl naphthalene-2-sulphonamide.

EXAMPLE 4

100 parts of hexamethylene diammonium adipate, 0.15 part of cyclohexylphosphonic acid, 0.73 part of hexamethylenediamine, 0.6 part of N-n-dodecylbenzene sulphonamide and 20 parts of water are charged to an aluminium lined autoclave which is the subjected to the same heating and pressure cycles as are used in Example 1. The polyamide is then converted to fibres.

The resulting polyamide fibres have a much higher uptake for Acid Dyestuffs when dyed from an aqueous dyebath of pH 8.5 than fibres which were similarly prepared in the absence of the 0.62 part of N-n-dodecylbenzene sulphonamide.

EXAMPLE 5

100 parts of hexamethylene diammonium adipate, 0.43 part of cyclohexylphosphonic acid, 0.73 part of hexamethylene diamine, 1.72 parts of N-n-butyl-p-toluene sulphonamide and 20 parts of water are charged to an aluminium lined autoclave which is then subjected to the same heating and pressure cycles as are used in Example 1. The polyamide is then converted to fibres.

The resulting fibres have a much higher uptake for Acid Dyestuffs when dyed from an aqueous dyebath of pH 8.5 than fibres which were similarly prepared in the absence of the 1.72 parts of N-n-butyl-p-toluene sulphonamide.

EXAMPLE 6

100 parts of hexamethylene diammonium adipate, 0.3 part of cyclohexylphosphonic acid, 0.73 part of hexamethylenediamine, 1.95 parts of N-methylbenzene sulphonamide and 20 parts of water are charged to an aluminium lined autoclave which is then subjected to the same heating and pressure cycles as are used in Example 1. The polyamide is then converted to fibres.

The resulting fibres have a much higher uptake for Acid Dyestuffs when dyed from an aqueous dyebath of pH 8.5 than fibres which were similarly prepared in the absence of the 1.95 parts of N-methylbenzene sulphonamide.

EXAMPLE 7

In place of the cylohexylphosphonic acid used in the above example there are used equivalent amounts of methylphosphonic acid or of phenylphosphonic acid when similar results are obtained.

We claim:
1. A polyamide consisting essentially of the polymeric condensation product of components selected from the class consisting of (a) monoaminomonocarboxylic acids, and the corresponding lactams, having at least two carbon atoms between the amino and carboxylic acid groups, (b) substantially equimolecular proportions of a diamine which contains at least two carbon atoms between the amino groups and a dicarboxylic acid which contains at least two carbon atoms between the carboxylic acid groups, and (c) mixtures of (a) and (b),
   in the presence of from 0.1 to 10.0 molar percent based on the molecular weight of the recurring units of the polyamide chain, of an organic diamine salt of a phosphonic acid of the formula

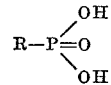

wherein R is selected from the class consisting of lower alkyl having from 1 to 4 carbon atoms, cyclohexyl and monocyclic aryl, and
   in the presence of from 0.1 to 5.0 molar percent, based on the molecular weight of the recurring units of of the polyamide chain, of a sulphonamide of the formula

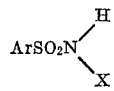

wherein Ar is selected from the class consisting of phenyl, tolyl and naphthyl radicals, and X is an alkyl radical having from 1 to 12 carbon atoms.

2. Polyamide as claimed in claim 1 which are obtained by polymerising substantially equimolecular proportions of hexamethylenediamine and adipic acid in the presence of from 0.1 to 10.0 molar percent, based on the molecular weight of the recurring units of the polyamide chain, of a hexamethylenediamine salt of cyclohexylphosphonic acid, and
   in the presence of from 0.1 to 5.0 molar percent, based on the molecular weight of the recurring units of the polyamide chain, of a sulphonamide of the formula:

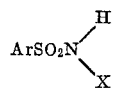

wherein Ar is selected from the class consisting of phenyl, tolyl and naphthyl radicals, and X is an alkyl radical having from 1 to 12 carbon atoms.

3. Polyamide as claimed in claim 1 which are obtained by polymerising substantially equimolecular proportions of hexamethylenediamine and adipic acid in the presence of from 0.1 to 10.0 molar percent, based on the molecular weight of the recurring unit of the polyamide chain, of a hexamethylenediamine salt of phenylphosphonic acid, and
   in the presence of from 0.1 to 5.0 molar percent, based on the molecular weight of the recurring units of the polyamide chain, of a sulphonamide of the formula

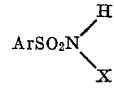

wherein Ar is selected from the class consisting of phenyl, tolyl and naphthyl radicals, and X is an alkyl radical having from 1 to 12 carbon atoms.

4. Polyamide of claim 1 wherein the sulphonamide is N-ethyl-p-toluene sulphonamide.

5. Polyamide of claim 1 wherein the sulphonamide is N-tert-butyl naphthalene-2-sulphonamide.

6. Polyamide of claim 1 wherein the sulphonamide is N-n- dodecylbenzene sulphonamide.

7

7. Polyamide of claim 1 wherein the sulphonamide is N-n butyl-p-toluene sulphonamide.

8. Polyamide of claim 1 wherein the sulphonamide is N-methylbenzene sulphonamide.

References Cited

UNITED STATES PATENTS

| | | | |
|---|---|---|---|
| 2,214,405 | 9/1940 | Coffman | 260—78 |
| 3,296,214 | 1/1967 | Pickett | 260—78 |
| 3,296,216 | 1/1967 | Snooks | 260—78 |
| 3,300,448 | 1/1967 | Gauthier et al. | 260—78 |
| 2,510,777 | 6/1950 | Gray | 260—78 |
| 2,705,227 | 3/1955 | Stamatoff | 260—78 |
| 2,981,715 | 4/1961 | Ben | 260—78 |
| 3,359,227 | 12/1967 | Amann et al. | 260—78 |
| 3,448,087 | 6/1967 | Ballentine et al. | 260—78 |

FOREIGN PATENTS

| | | | |
|---|---|---|---|
| 561,702 | 6/1944 | Great Britain | 260—78 |

HAROLD D. ANDERSON, Primary Examiner

U.S. Cl. X.R.

8—55; 260—45.75, 45.9